UNITED STATES PATENT OFFICE.

HENRY C. FREIST, OF PHILADELPHIA, PENNSYLVANIA, ASSIGNOR TO HARRISON BROTHERS & CO., OF SAME PLACE.

MANUFACTURE OF HYDRATE OF ALUMINA.

SPECIFICATION forming part of Letters Patent No. 328,478, dated October 20, 1885.

Application filed July 16, 1885. Serial No. 171,764. (No specimens.)

*To all whom it may concern:*

Be it known that I, HENRY C. FREIST, of the city and county of Philadelphia, and State of Pennsylvania, have invented a new and improved method of producing from kaolin, bauxite, or other of the commonly-employed aluminous materials containing iron, an artificial hydrate of alumina free from iron.

The following description will enable those skilled in the art to which my invention appertains to practice it.

In my process the kaolin, bauxite, or other aluminous material employed is first finely ground and is then, with a mixture of sulphate of soda or potash, carbonate of lime, coal-dust, and fluor-spar, or equivalent material, treated at a high heat in a furnace of any ordinary construction. I do not confine myself to the use of any specific proportions of the above-named materials, although I have obtained good results by using the following proportions, namely: thirteen hundred pounds of sulphate of soda, or instead thereof its equivalent of sulphate of potash, eight hundred and fifty pounds of carbonate of lime, six hundred pounds of pulverized coal, six hundred pounds of powdered bauxite, and four hundred pounds of powdered fluor-spar. After this mixture has been thoroughly fused in a furnace it is removed therefrom and placed in vessels, in which it is subjected to the action of water and leached. The solution resulting from this leaching process is treated with any suitable metallic peroxide, sesquioxide, or hyperoxide—preferably with the peroxide of manganese. Artificial peroxide of manganese resulting from the Weldon process and known as "Weldon mud" is cheap and well adapted for this purpose. The action of these peroxides, sesqui or hyper oxides of the metals on a ferruginous solution of aluminate of soda is that the sulphides of soda and sulphides of iron are decomposed by oxidation, sulphate of soda or potash formed, and the iron precipitated in an insoluble form as ferric-oxide. The metal contained in the oxidizing material employed is at the same time precipitated with the iron.

I am well aware that Bellard in 1862 made aluminate of soda by fusing together a mixture of bauxite, sulphate of soda, and coal, and I am further aware that oxides of copper, zinc, or lead, have been used to remove the iron; but I am not aware that any one has succeeded by these processes in obtaining a pure aluminate of soda.

A method of practicing my invention is as follows: Finely-divided bauxite, sulphate of soda, coal, fluor-spar, and carbonate of lime, in about the proportions given above, are mixed, and are in any suitable furnace submitted to a high temperature for about two hours. The charge is then removed from the furnace, is placed in leaching-tanks, and is subjected to the action of water. The solution of aluminate of soda is removed from said tanks and a sufficient quantity of metallic peroxide, sesquioxide, or hyperoxide— preferably sesquioxide of manganese—added thereto to decompose the sulphide of iron and sulphide of soda compound, and to precipitate the iron in an insoluble form. The quantity of peroxide to be employed is governed by the quantity of sulphide of iron and sulphide of soda present in the solution to be treated. It is, however, always advantageous to employ it in excess. The liquor is then placed in suitable tanks, and is left to subside. When the iron or other impurities have settled out or have been otherwise removed, the clear liquor is drawn off and subjected to the action of carbonic-acid gas. The carbonic acid combines with the sodium, forming carbonate of soda, while the alumina is precipitated as hydrate of alumina, and is finally removed from the solution of carbonate of soda by subsidence, filtration, or by other well-known means.

I am aware that Letters Patent of the United States No. 257,567, dated May 9, 1882, have been granted to Constantine Fahlberg and Conrad Semper, for a method of removing iron from ferruginous saline solutions by the use of plumbic dioxide.

I am also aware that Letters Patent of the United States No. 223,443, dated January 13, 1880, have been granted to Robert A. Fisher for the manufacture of a white compound for paper-makers' use by treating a solution of sulphate of alumina with a reducing agent to convert ferric into ferrous salts, and in treating said solution with oxide of zinc to neutralize the free acid in the same.

I am also aware that Letters Patent of the United States No. 264,773, dated September 19, 1882, were granted to Conrad Semper for a process of removing iron from ferruginous saline solutions by treating such solutions with manganic dioxide or manganic sesquioxide.

I am also aware that British Letters Patent No. 957 of 1859 were granted to Le Chatelier for improvements in the manufacture of alumina, and that British Letters Patent No. 2,866 of 1870 were granted to Baker for the manufacture of alkaline salts, and that in both of these patents carbonic acid is employed to precipitate alumina from its solutions.

I am not aware that an artificial hydrate of alumina has been made by treating an aluminous material in the manner and under the conditions set forth in the successive steps of the process hereinafter claimed.

Having thus described my invention, I claim—

The method of making artificial hydrate of alumina from bauxite or other aluminous material, which consists, first, in treating such aluminous material in a ground or pulverized condition and mixed with sulphate of soda, carbonate of lime, coal-dust, and fluor-spar or its equivalent, to heat; second, in leaching the mass; third, in treating the resulting solution, either before or after the insoluble impurities have been removed therefrom, with a metallic peroxide, sesquioxide, or hyperoxide to precipitate the iron in said solution in an insoluble form; fourth, in removing the insoluble impurities from said solution and subjecting the resulting clear liquor to the action of carbonic-acid gas to form carbonate of soda and to precipitate the alumina in said solution as hydrate of alumina, and, finally, in removing said hydrate of alumina from said solution by subsidence or other convenient means, as specified.

In testimony whereof I have hereunto signed my name this 10th day of July, A. D. 1885.

HENRY C. FREIST.

In presence of—
J. BONSALL TAYLOR,
W. C. STRAWBRIDGE.